B. ELSHOFF.
INDUCTION MOTOR.
APPLICATION FILED DEC. 14, 1915. RENEWED SEPT. 19, 1917.
1,306,532.
Patented June 10, 1919.
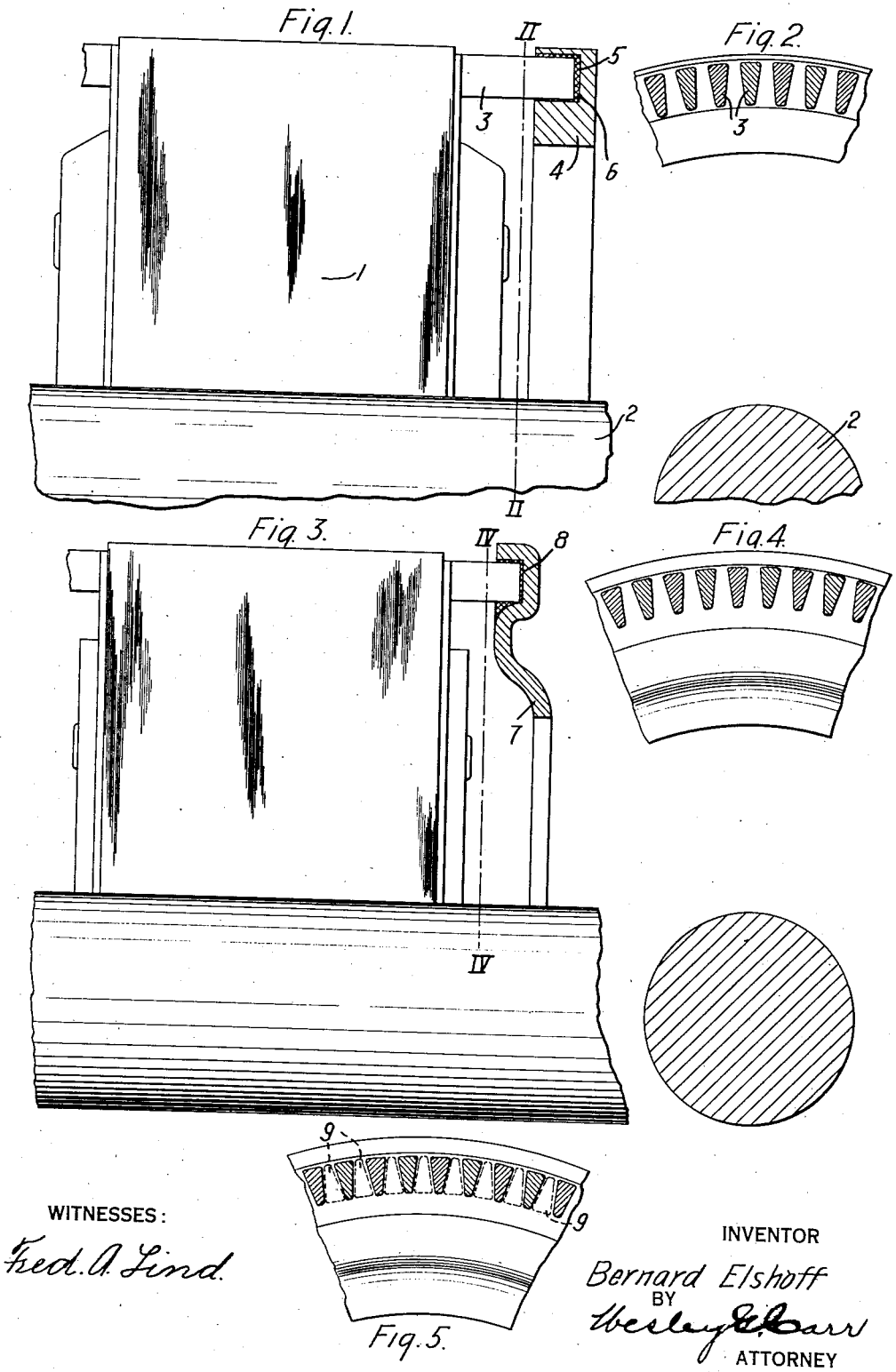
WITNESSES:
Fred. A. Lind.
INVENTOR
Bernard Elshoff
BY
ATTORNEY

UNITED STATES PATENT OFFICE.

BERNARD ELSHOFF, OF NEWARK, NEW JERSEY, ASSIGNOR TO WESTINGHOUSE ELECTRIC AND MANUFACTURING COMPANY, A CORPORATION OF PENNSYLVANIA.

INDUCTION-MOTOR.

1,306,532.  Specification of Letters Patent.  Patented June 10, 1919.

Application filed December 14, 1915, Serial No. 66,732. Renewed September 19, 1917. Serial No. 192,229.

*To all whom it may concern:*

Be it known that I, BERNARD ELSHOFF, a citizen of the United States, and a resident of Newark, in the county of Essex and State of New Jersey, have invented a new and useful Improvement in Induction-Motors, of which the following is a specification.

My invention relates to induction motors and particularly to the secondary members of such motors, and it has for its object to provide a secondary member of exceptionally simple and economical construction.

The usual construction of the secondary members of induction motors comprises a magnetizable core, conducting bars extending through and beyond the ends of the core and conducting end-rings connecting the projecting end portions of the bars. It has been customary, heretofore, to cast the end-rings upon the conducting bars, thereby providing a substantially unitary structure having great mechanical strength. However, secondary members so constructed are not entirely satisfactory owing to the fact that the conductivity of the cast-on end-rings differs materially from that of the conducting bars. Furthermore, air holes and various other faults commonly found in castings may occur at the points of union between the bars and the end-rings and give rise to serious operating difficulties.

According to the present invention, I provide a secondary member in which the conducting bars and end-rings have substantially the same electrical conductivity and are joined together in a novel way to produce a unitary structure possessing as much mechanical strength as the above-mentioned cast-on end-ring construction.

In the accompanying drawing, Figure 1 is a view, partially in section and partially in side elevation, of a portion of the secondary member of an induction motor embodying my invention; Fig. 2 is a sectional view along the line II—II of Fig. 1; Fig. 3 is a view, similar to Fig. 1, showing a modification of my invention; Fig. 4 is a sectional view along the line IV—IV of Fig. 3; and Fig. 5 is a fragmentary sectional view showing a further modification of my invention.

The secondary member of an induction motor comprises a laminated core 1 that is provided with peripheral slots and is mounted on a shaft 2. Conducting bars 3, preferably composed of copper, are located in the slots of the core structure 1 and extend beyond the ends thereof. An end-ring 4, preferably composed of copper having substantially the same degree of electrical conductivity as the conducting bars 3, is provided with an annular groove or side depression 5 to receive the projecting ends of the conducting bars 3 and fusible conducting material 6. The conducting material 6 is preferably in the form of powdered brass spelter or other fusible alloy having good electrical conductivity. The end-ring 4 is then subjected to a degree of heat that is sufficient to cause the fusible conducting material 6 to unite with the projecting ends of the conducting bars 3 and the base and sides of the depression 5 and thereby form a unitary structure. It is to be understood that the heat for accomplishing this result may be applied locally, as, for example, by an acetylene torch, or the material 6 may be fused by subjecting the secondary member, as a whole, to the heat of a suitably constructed furnace.

In the modification shown in Figs. 3 and 4, the end ring 7 is composed, preferably, of sheet copper and is provided with an annular side depression 8 that is adapted to receive the projecting ends of the conducting bars 3. Conducting material 6 is placed in the portions of the depression not occupied by the bars and is then fused to unite the bars and the end ring as above described.

A further modification is shown in Fig. 5 wherein pieces 9, composed, preferably, of copper and having substantially the same cross-section as the conducting bars 3, are placed in the side depression 8 between the ends of the conducting bars 3, the remaining spaces being then filled by fusible conducting material 6 and the various parts united as described above.

The structural feature, herein designated as a side depression, whatever may be its cross sectional form or dimensions, receives and retains the ends of the bar conductors in such relation that they are rigidly and securely held in position by the fusible metal that is in intimate engagement with their ends and sides and with at least one of their edges.

While I have shown my invention in its simplest and preferred form, it is not so limited but is susceptible of various minor changes within the scope of the appended claims.

I claim as my invention:

1. In a dynamo-electric machine, the combination with a slotted core member and conducting bars extending through and beyond the ends of the core slots, of conducting end members provided with side depressions into which the ends of the said bars project, and conducting material filling all portions of the said depressions that are not occupied by the bar ends.

2. In a dynamo-electric machine, the combination with a slotted core member and conducting bars extending through and beyond the ends of the core slots, of conducting end members provided with side depressions into which the ends of the said bars project, and conducting material filling the portions of the said depressions not occupied by the bar ends and serving to form an intimate union between the side and end surfaces of the bar ends and the corresponding depression walls.

3. In a dynamo-electric machine, the combination with a slotted core member and conducting bars extending through and beyond the ends of the core slots, and conducting end members provided with annular grooves in which the ends of said bars are disposed, of conducting material filling the portions of said grooves not occupied by the bar ends and serving to unite said bar ends to the said end members.

4. In a dynamo-electric machine, the combination with a slotted core and conducting bars located in the core slots and projecting beyond the core ends, and conducting end members provided with annular side grooves to receive the projecting ends of said conducting bars, of conducting material interposed between the side and end surfaces of the bar ends and the walls of said grooves and serving to unite said bar ends to said end members.

5. In a dynamo-electric machine, the combination with a slotted core and conducting bars located in the core slots and projecting beyond the core ends, and conducting end rings having annular grooves within which the projecting ends of said bars are located, of fusible conducting material filling the portions of said grooves not occupied by the bar ends and serving to unite said ends to said rings.

In testimony whereof, I have hereunto subscribed my name this eighth day of December 1915.

BERNARD ELSHOFF.

Witnesses:
JOSEPH FARBER,
FRANCIS J. O'NEILL.